United States Patent
Stephens

(10) Patent No.: US 8,745,043 B2
(45) Date of Patent: *Jun. 3, 2014

(54) DETERMINING SORT ORDER BY DISTANCE

(71) Applicant: AT&T Intellectual Property I, L.P., Atlanta, GA (US)

(72) Inventor: Robert Todd Stephens, Fayetteville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/938,699

(22) Filed: Jul. 10, 2013

(65) Prior Publication Data

US 2013/0297595 A1    Nov. 7, 2013

Related U.S. Application Data

(63) Continuation of application No. 13/309,075, filed on Dec. 1, 2011, now Pat. No. 8,510,293, which is a continuation of application No. 11/557,321, filed on Nov. 7, 2006, now Pat. No. 8,156,112.

(51) Int. Cl.
*G06F 7/00* (2006.01)
*G06F 17/30* (2006.01)

(52) U.S. Cl.
USPC ........................................................ 707/723

(58) Field of Classification Search
USPC ........................................ 707/723, 999.007
See application file for complete search history.

(56) References Cited

U.S. PATENT DOCUMENTS

| | | | |
|---|---|---|---|
| 6,012,053 A * | 1/2000 | Pant et al. | 1/1 |
| 6,434,556 B1 | 8/2002 | Levin et al. | |
| 6,631,412 B1 | 10/2003 | Glasser | |
| 6,636,853 B1 | 10/2003 | Stephens, Jr. | |
| 6,658,423 B1 | 12/2003 | Pugh et al. | |
| 6,691,108 B2 | 2/2004 | Li | |
| 6,757,710 B2 | 6/2004 | Reed et al. | |
| 6,845,377 B2 | 1/2005 | Yamane et al. | |
| 6,963,867 B2 | 11/2005 | Ford et al. | |
| 7,302,646 B2 | 11/2007 | Nomiyama et al. | |
| 7,376,672 B2 | 5/2008 | Weare | |
| 7,664,735 B2 | 2/2010 | Zhang et al. | |
| 7,996,391 B2 | 8/2011 | Castro et al. | |
| 2002/0091684 A1 | 7/2002 | Nomiyama et al. | |
| 2002/0095454 A1 | 7/2002 | Reed et al. | |
| 2002/0099700 A1 | 7/2002 | Li | |
| 2003/0005159 A1 | 1/2003 | Kumhyr | |
| 2003/0163784 A1 | 8/2003 | Daniel et al. | |
| 2004/0220926 A1 | 11/2004 | Lamkin et al. | |

(Continued)

OTHER PUBLICATIONS

Broder, et al. "Graph Structure in the Web," Jun. 1, 2000, Computer Networks, vol. 33, Issues 1-6,309-320.*

(Continued)

*Primary Examiner* — Aleksandr Kerzhner
(74) *Attorney, Agent, or Firm* — Baker & Hostetler LLP

(57) ABSTRACT

Included are embodiments for determining sort order. At least one embodiment of a method includes determining a plurality of search results associated with at least one search criteria. Some embodiments of a method include determining a first distance between at least one of the search results and a home page associated with the at least one search result and determining a display order for the plurality of search results.

20 Claims, 16 Drawing Sheets

(56) References Cited

U.S. PATENT DOCUMENTS

| | | |
|---|---|---|
| 2004/0267815 A1 | 12/2004 | De Mes |
| 2005/0114317 A1 | 5/2005 | Bhide et al. |
| 2005/0234891 A1 | 10/2005 | Walther et al. |
| 2005/0246328 A1 | 11/2005 | Zhang et al. |
| 2006/0074903 A1 | 4/2006 | Meyerzon et al. |
| 2006/0085397 A1* | 4/2006 | D'Urso .......................... 707/3 |
| 2006/0274653 A1 | 12/2006 | Charzinski et al. |
| 2006/0287985 A1 | 12/2006 | Castro et al. |
| 2007/0061303 A1 | 3/2007 | Ramer et al. |
| 2007/0192318 A1 | 8/2007 | Ramer et al. |
| 2007/0214116 A1 | 9/2007 | Liu et al. |
| 2007/0266001 A1 | 11/2007 | Williams et al. |
| 2008/0034279 A1 | 2/2008 | Kumar et al. |
| 2008/0109434 A1 | 5/2008 | Stephens |
| 2008/0109435 A1 | 5/2008 | Stephens |
| 2008/0109441 A1 | 5/2008 | Stephens |
| 2008/0313115 A1 | 12/2008 | Galvin |
| 2012/0078893 A1 | 3/2012 | Stephens |

OTHER PUBLICATIONS

Broder, et al. "Graph Structure in the Web," Jun. 1, 2000, Computer Networks, vol. 33, Issues 1-6, 309-320.

* cited by examiner

DETERMINING SORT ORDER BY DISTANCE

CROSS REFERENCE

This is a continuation of, and claims priority to, U.S. application Ser. No. 13/309,075, filed on Dec. 1, 2011, now U.S. Pat. No. 8,510,293, issued on Aug. 13, 2013, which is a continuation of U.S. application Ser. No. 11/557,321, filed on Nov. 7, 2006, now U.S. Pat. No. 8,156,112, issued on Apr. 10, 2012, the contents of each of which are incorporated by reference in their entirety herein. This application is related to U.S. patent application Ser. No. 11/557,325, entitled "Determining Sort Order by Traffic Volume", and U.S. patent application Ser. No. 11/557,314, now U.S. Pat. No. 8,301,621, issued on Oct. 30, 2013, entitled "Topic Map for Navigational Control ," both filed on Nov. 7, 2006, and each of which are incorporated by reference in their entireties herein.

TECHNICAL FIELD

Included are embodiments for determining sort order. More specifically, included are embodiments for determining sort order by distance.

BACKGROUND

As the number of web pages increases (either on the Internet as a whole, on an Intranet, and/or on a particular website), users may have difficulty locating data that may reside on a web page. To combat this problem, websites have emerged that provide searching capabilities. These "search engines" may be configured to provide search options for locating data on the Internet. To provide these search options, search engines often utilize search algorithms for locating desired web pages. Once a collection of web pages is determined, many search engines determine a display order for the search results.

Many search engines determine display order based on the number of links on a web page and/or the number of times the search term occurs within the body of the web page. While these criteria can be beneficial, these criteria oftentimes do not provide a display order with the most relevant search results being most accessible to the user. As such, the user may be forced to sort through numerous search results before locating a web page with the desired information. As such, the user may miss the most relevant web page.

Thus, a heretofore unaddressed need exists in the industry to address the aforementioned deficiencies and inadequacies.

SUMMARY

Included are embodiments for determining sort order. At least one embodiment of a method includes determining a plurality of search results associated with at least one search criteria. Some embodiments of a method include determining a first distance between at least one of the search results and a home page associated with the at least one search result and determining a display order for the plurality of search results.

Also included are embodiments of a system for determining sort order. At least one embodiment of a system includes a results determining component configured to determine at least one search result associated with at least one search criteria. Some embodiments include a distance determining component configured to determine a first distance between the at least one of search result and a home page associated with the at least one search result.

Also included are embodiments of a computer readable medium for determining sort order. At least one embodiment of a computer readable medium includes results determining logic configured to determine a plurality of search results associated with at least one search criteria. Some embodiments include distance determining logic configured to determine a first distance between at least one of the search results and a home page associated with the at least one search result and order determining logic configured to determine a display order for the plurality of search results.

Other systems, methods, features, and advantages of this disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION OF ILLUSTRATIVE EMBODIMENTS

Figure 1:
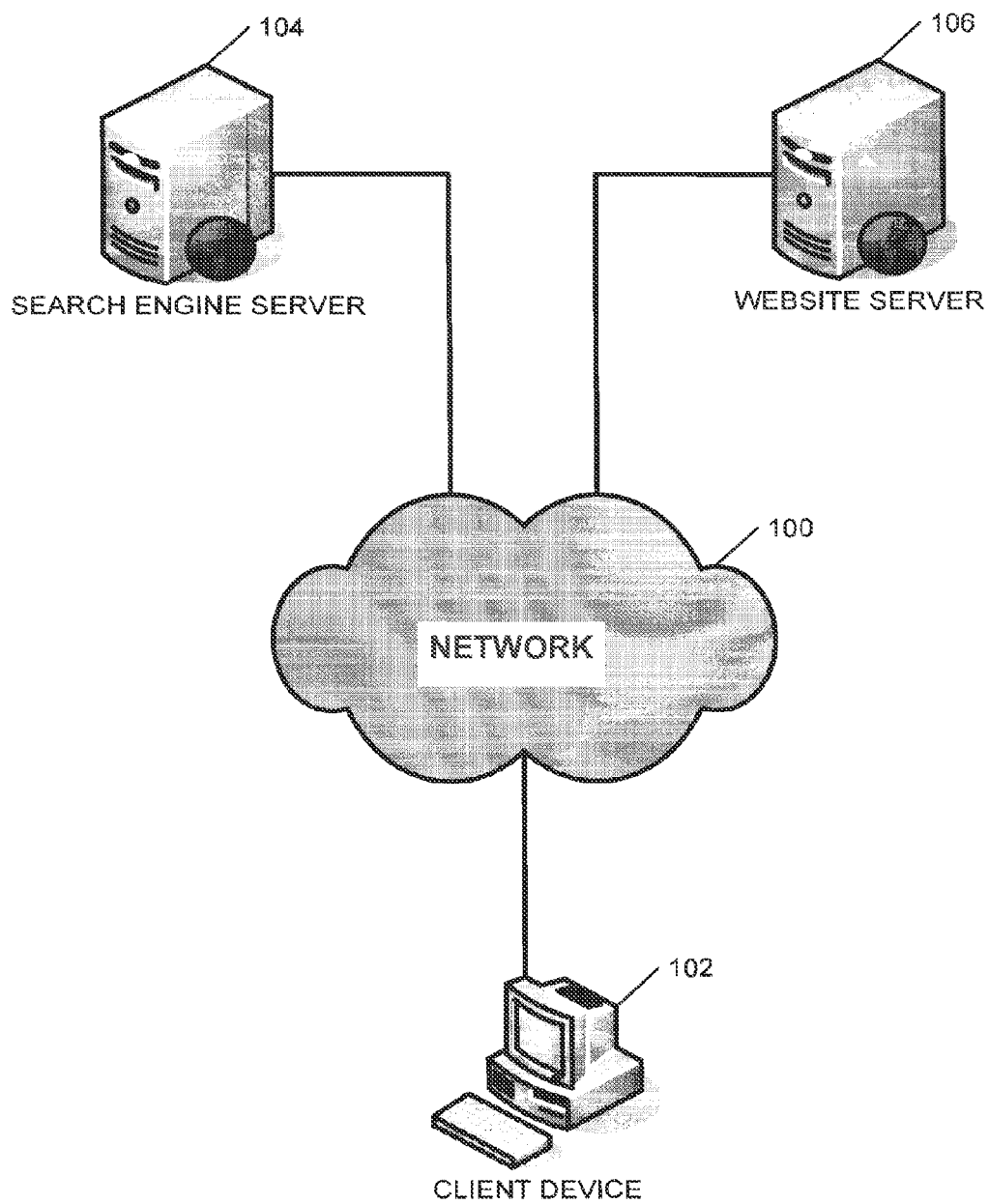
FIG. 1 is a network diagram illustrating exemplary components that may be implemented to provide a user with website data.

FIG. 1 is a network diagram illustrating exemplary components that may be implemented to provide a user with website data. More specifically, the configuration from FIG. 1 illustrates a client device 102 coupled to a network 100, such as the Internet. The network 100 may also be coupled to a search engine server 104, as well as a website server 106. In operation, the client device 102 can access the network 100, which can act as a portal for data provided by the search engine server 104. The search engine server 104 can provide data related to a web page that allows the user of the client device 102 to enter search criteria related to desired subject matter. The search engine server 104 can then search other web pages associated with the network 100, according to the received search criteria. Upon completing the search, the search engine server 104 can provide data (which may take the form of source code) that includes an address associated with at least one of the web pages revealed in the search. Upon receiving the data, a web browser (and/or other logic) associated with the client device 102 can determine a format for displaying the received information. The user can then select at least one of the addresses. Upon receiving the user selection, the search engine server 104 can redirect the client device 102 to the website server 106, associated with the selected address.

One should note that although a single server is illustrated for representing the search engine server 104, one should note that one or more servers, computers, etc. may be utilized to provide the desired functionality. Similarly, while the components of FIG. 1 are illustrated as having a wired connection to the network 100, this is also a non-limiting example. In at least one embodiment one or more components may be wirelessly coupled to the network 100.

Figure 2:
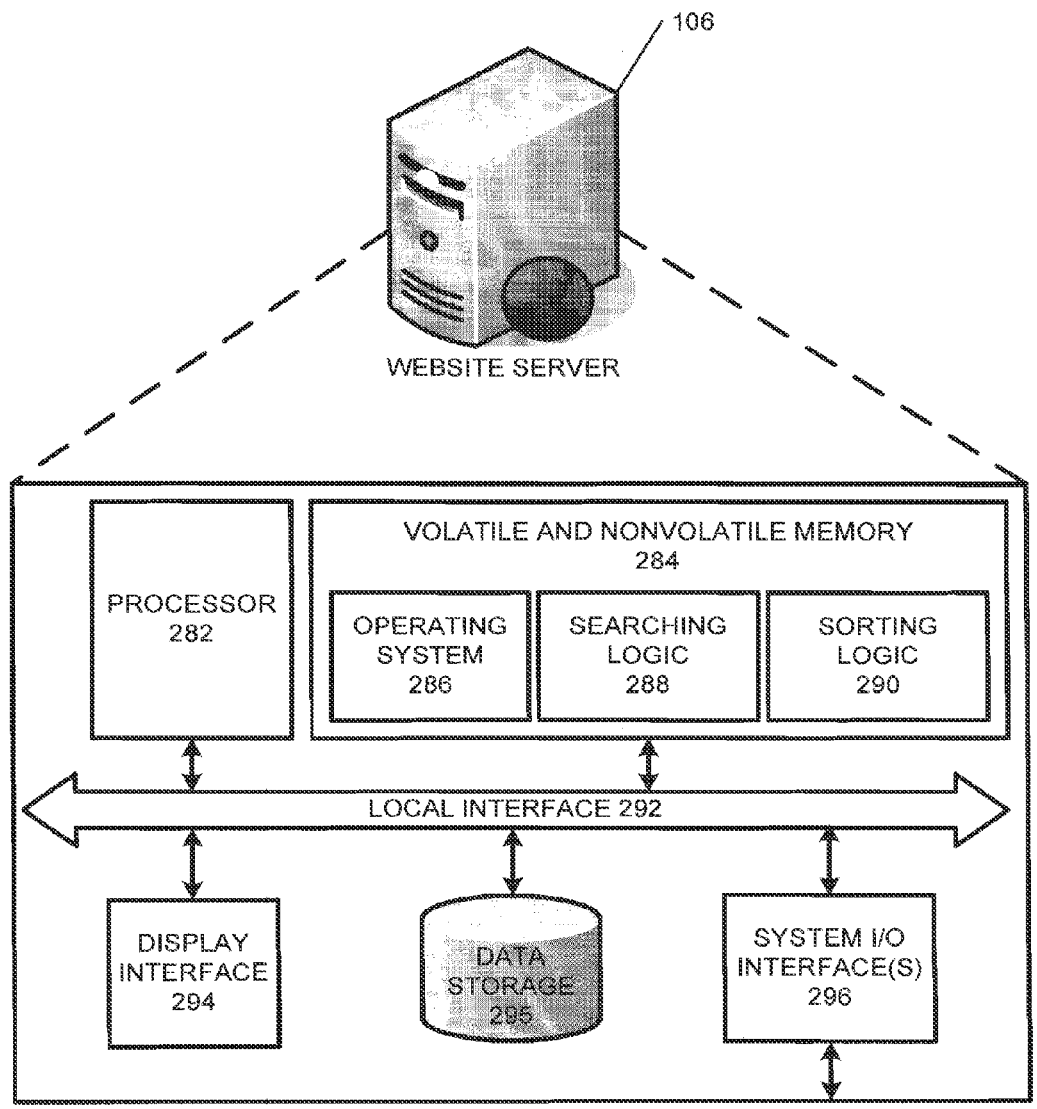
FIG. 2 is a block diagram illustrating exemplary components that may be associated with a client device, such as the client device from FIG. 1.

FIG. 2 is a block diagram illustrating exemplary components that may be associated with a website server, such as the website server 106 from FIG. 1. Although a wire-line server is illustrated, this discussion can be applied to wireless devices, as well. Generally, in terms of hardware architecture, as shown in FIG. 2, the server 106 includes a processor 282, volatile and nonvolatile memory 284, a display interface 294, data storage 295, one or more input and/or output (I/O) device interface(s) 296, and/or one or more network interfaces that are communicatively coupled via a local interface 292. The local interface 292 can include, for example but not limited to, one or more buses and/or other wired and/or wireless connections. The local interface 292 may have additional elements, which are omitted for simplicity, such as controllers, buffers (caches), drivers, repeaters, and receivers to enable communications. Further, the local interface 292 may include address, control, and/or data connections to enable appropriate communications among the aforementioned components. The processor 282 may be a device for executing software, particularly software stored in volatile and nonvolatile memory 284. The processor 282 can include any custom made or commercially available processor, a central processing unit (CPU), an auxiliary processor among several processors associated with the server 104, a semiconductor based microprocessor (in the form of a microchip or chip set), a macroprocessor, and/or generally any device for executing software instructions.

The volatile and nonvolatile memory 284 can include any one or combination of volatile memory elements (e.g., random access memory (RAM, such as DRAM, SRAM, SDRAM, etc.)) and/or nonvolatile memory elements (e.g., ROM, hard drive, tape, CDROM, etc.). Moreover, the memory 284 may incorporate electronic, magnetic, optical, and/or other types of storage media. One should note that the volatile and nonvolatile memory 284 can have a distributed architecture (where various components are situated remote from one another), but can be accessed by the processor 282.

The software in volatile and nonvolatile memory 284 may include one or more separate programs, each of which includes an ordered listing of executable instructions for implementing logical functions. In the example of FIG. 2, the software in the volatile and nonvolatile memory 284 may include searching logic 288, sorting logic 290, as well as an operating system 286. The operating system 286 essentially controls the execution of other computer programs and provides scheduling, input-output control, file and data management, memory management, and communication control and related services.

A system component and/or module embodied as software may also be construed as a source program, executable program (object code), script, or any other entity comprising a set of instructions to be performed. When constructed as a source program, the program is translated via a compiler, assembler, interpreter, or the like, which may or may not be included within the volatile and nonvolatile memory 284, so as to operate properly in connection with the operating system 286.

The Input/Output devices that may be coupled to system I/O Interface(s) 296 may include input devices, for example but not limited to, a keyboard, mouse, scanner, microphone, etc. Further, the Input/Output devices may also include output devices, for example but not limited to, a printer, display, speaker, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

If the server 106 includes a personal computer, workstation, or the like, the software in the volatile and nonvolatile memory 284 may further include a basic input output system (BIOS) (omitted for simplicity). The BIOS is a set of software routines that initialize and test hardware at startup, start the operating system 286, and support the transfer of data among the hardware devices. The BIOS is stored in ROM so that the BIOS can be executed when the server 104 is activated.

When server 106 is in operation, the processor 282 may be configured to execute software stored within the volatile and nonvolatile memory 284, to communicate data to and from the volatile and nonvolatile memory 284, and to generally control operations of the server 106 pursuant to the software. Software in memory, in whole or in part, may be read by the processor 282, perhaps buffered within the processor 282, and then executed.

One should note that while the description with respect to FIG. 2 includes a server 106 as a single component, this is a non-limiting example. More specifically, in at least one embodiment, the server 106 can include a plurality of servers, personal computers, and/or other devices. Similarly, while the description of FIG. 2 describes a server 106, this is also a non-limiting example, as other components may also be included in this description, such as a search engine server 104, the client device 102 and/or other components.

Figure 3:
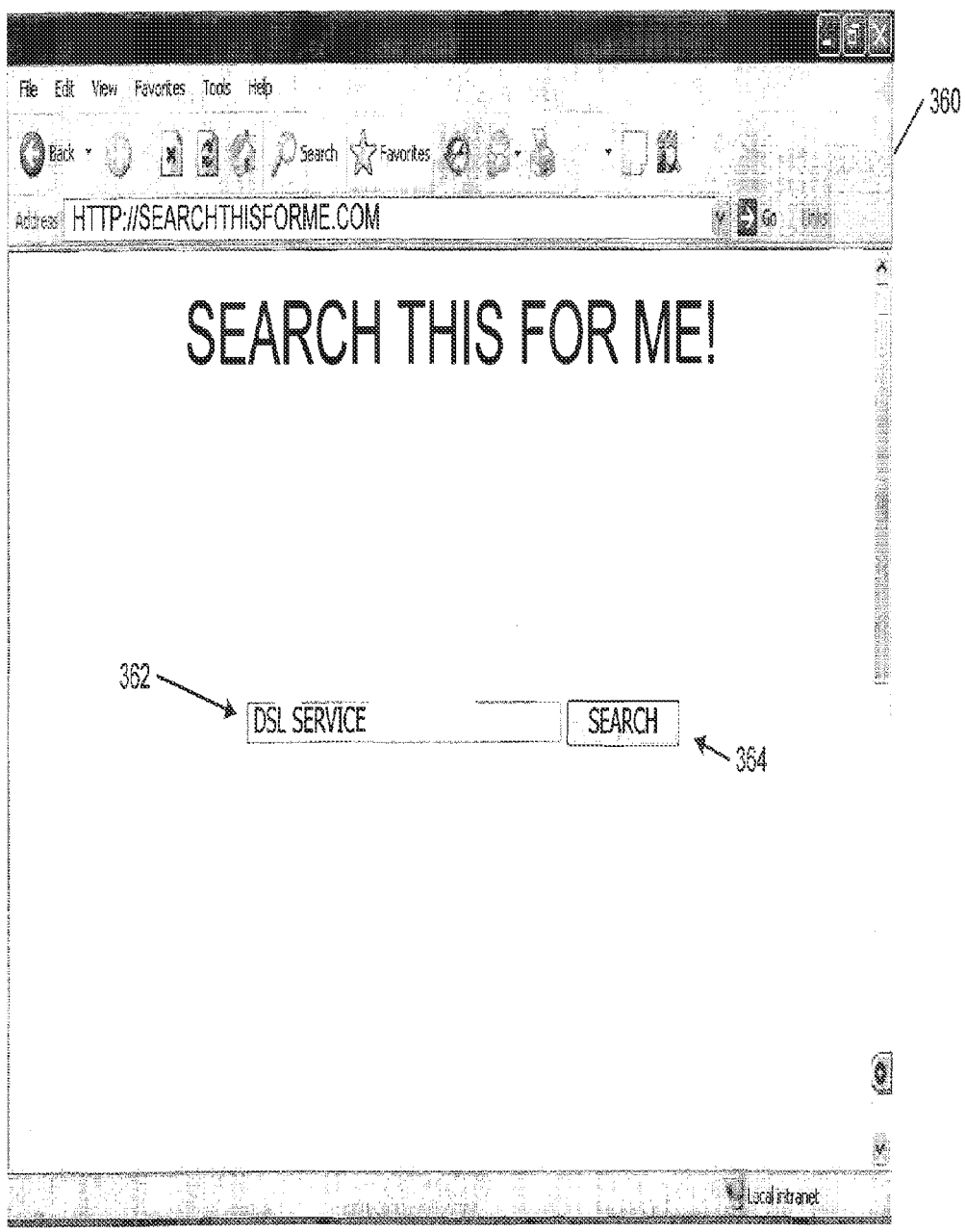
FIG. 3 is a non-limiting example of a user interface, illustrating searching capabilities that may be provided by the search engine server from FIG. 1.

FIG. 3 is a non-limiting example of a user interface 360, illustrating searching capabilities that may be provided by the search engine server 104 from FIG. 1. The user interface 360 includes searching options for a user to locate data on one or more web pages. The user interface 360 includes a text prompt 362 and a search execution option 364 for initiating a search. More specifically, a user may input the desired search criteria in the text prompt 362 and select the search execution option 364. In response to receiving this data, a web browser component associated with the client device 102 sends the search criteria to a search engine server 104 (and/or website server 106, depending on the configuration). The server 104 and/or 106 can then compare the search criteria to data associated with one or more web pages on the Internet and/or Intranet.

In response to locating one or more web pages associated with the search criteria, the search engine server 104 can return more search results to the web browser. The web browser can then provide a user interface that includes the retrieved search results. The user may select one of the search results to access the desired information. As indicated above, while this search engine server 104 may provide a plurality of data related to a search criteria, in many configurations, this data may be unorganized and difficult for a user to determine relevancy to the search criteria.

Figure 4:
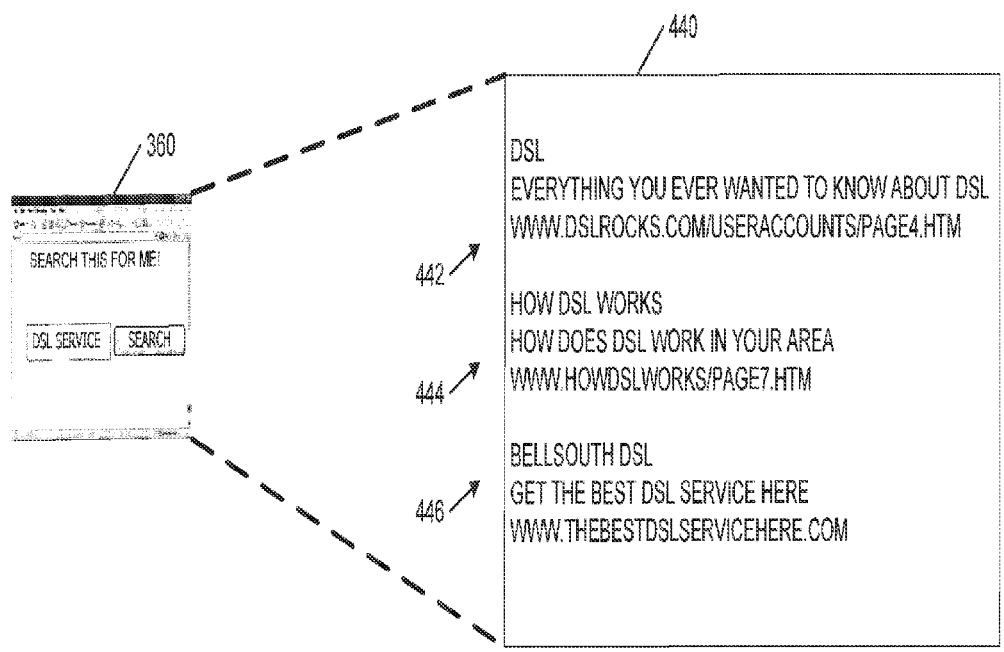
FIG. 4 is an exemplary embodiment of a user interface with associated search results from the search from FIG. 3.

FIG. 4 is an exemplary embodiment of a user interface with associated search results from the search from FIG. 3. As illustrated in the non-limiting example of FIG. 4, a user has performed a search for the terms "DSL" and "Service." The search engine server 104 and/or website server 106 have searched the network 100 for the terms and metadata related to the search and have returned results 442, 444, and 446, which are displayed in a Box 440. The box 440 includes search data related to the results entitled "DSL" 442, "How DSL Works" 444, and "BellSouth DSL" 446. Additionally associated with the search results 442 is a description of the website and a URL associated with the search result. The description states "Everything you ever wanted to know about DSL" and the URL includes www.dslrocks.com/useraccounts/page4.htm. Similarly, the search result 444 includes a description "How DSL works in your area," as well as a URL www.howdslworks/page7.htm. The search result 446 includes a description "Get the best DSL service here" and a URL www.thebestdslservicehere.com. While a search result may be found by any of a plurality of algorithms, the display order of the search results is discussed with regard to FIG. 5.

Figure 5:
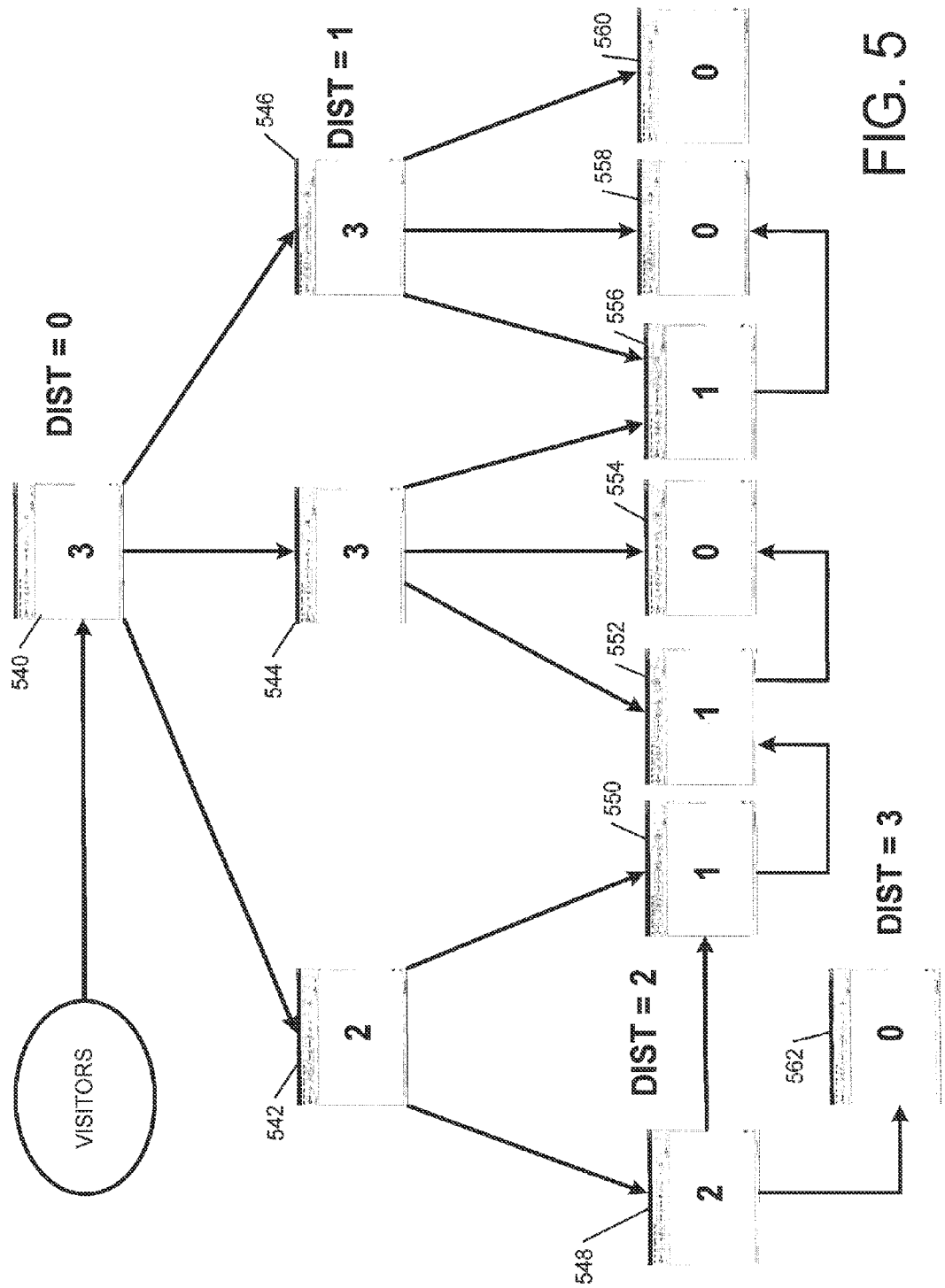
FIG. 5 is a non-limiting example of a plurality of user interfaces, illustrating an exemplary relationship among a plurality of web pages on a website, such as the web page from FIG. 4.

FIG. 5 is a non-limiting example of a plurality of user interfaces, illustrating an exemplary relationship among a plurality of web pages on a website, such as the web page from FIG. 4. As illustrated in the non-limiting example of FIG. 5, a search result 442 may be associated with a website topology. More specifically, a website may include a plurality of web pages 540-562, with a home page 540. The home page 540 may include three links to second tier web pages 542, 544, and 546, as indicated with the number 3. Similarly, the second tier web page 542 may have two links to third tier web pages 540 and 550. The second tier web page 544 may include links to third tier web pages 552, 554, and 556. The web page 546 may include links to third tier web pages 556, 558, and 560. The third tier web page 548 links to two web pages, more specifically the third tier web pages 550 and a fourth tier web page 562, as indicated with the "2" in web page 548. The web page 550 includes a link to a third tier web page 552. The third tier web page 552 links to a third tier web page 554. The third tier web page 556 a link to a third tier web page 558.

Upon receiving search results as illustrated in FIG. 4, the search engine server 104 may determine a sort order based (at least in part) on the number of links from a web page. More specifically, a search result that includes links to a large number of other web pages may be given more weight than a search result that links to fewer web pages. As a non-limiting example, with respect to FIG. 5, if search results include a web page 544 and web page 554, with all other criteria being equal, the web page 544 might be listed as being more relevant due to the fact that the web page 544 links to three web pages, whereas web page 554 links to zero web pages.

Figure 6:
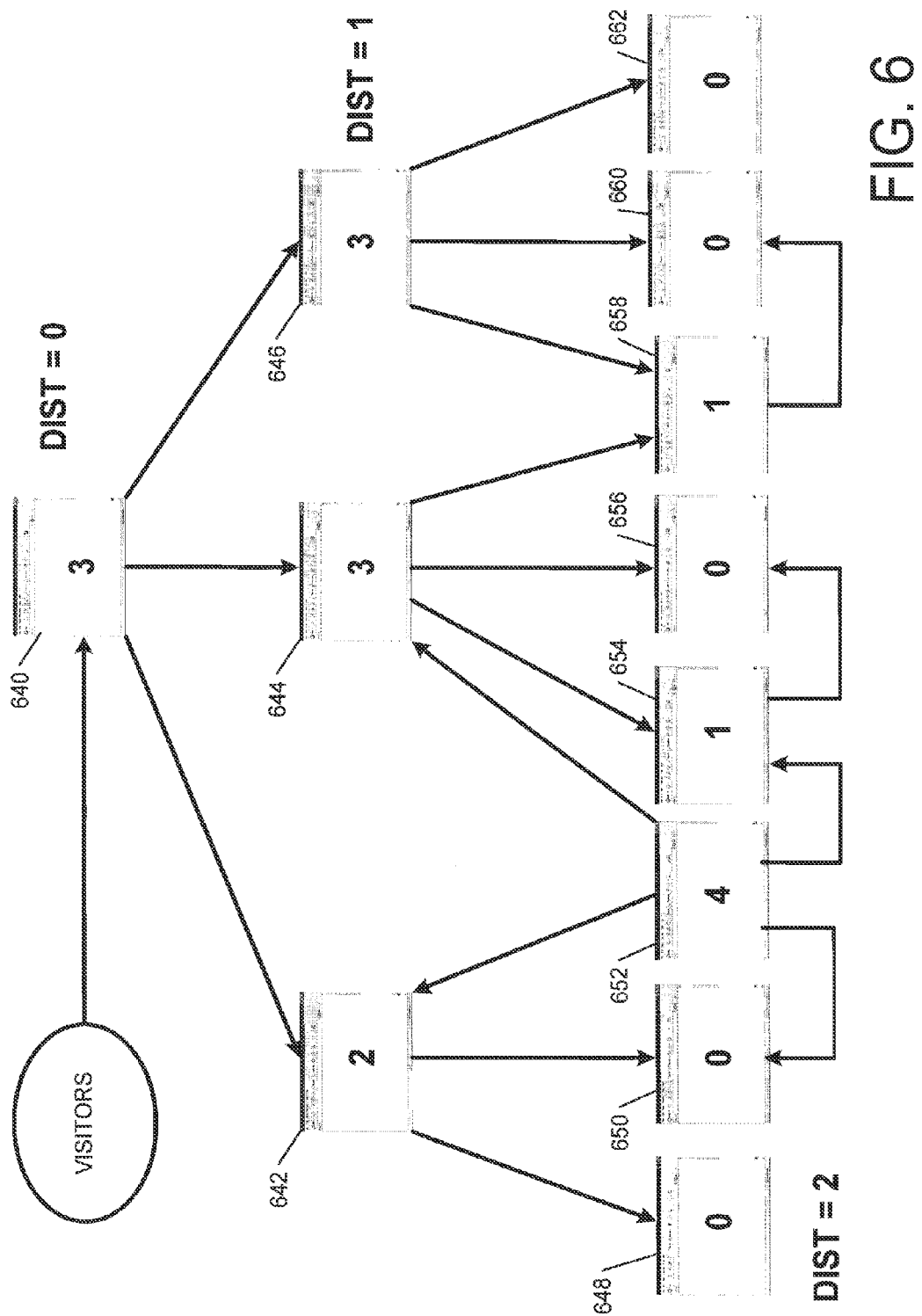
FIG. 6 is a non-limiting example of a plurality of user interfaces, illustrating another exemplary relationship within a website, similar to the website from FIG. 5.

FIG. 6 is a non-limiting example of a plurality of user interfaces, illustrating another exemplary relationship upon a plurality of web pages within a website, similar to website from FIG. 5. As illustrated in the non-limiting example of FIG. 6, a search result may be associated with a website that includes a plurality of web pages. More specifically, a website may include a home page 640 that links to three other web pages, as indicated by the number "3" in the web page 640. The home page 640 links to the second tier web pages 642, 644, and 646. The second tier web page 642 links to third tier web pages 648, and 650. The second tier web page 644 links to a third tier web page 654, a third tier web page 656, and a third tier web page 658. The second tier web page 646 links to third tier web pages 658, 660, and 662. The third tier web page 652 links to a second tier web page 642 and 644, as well as third tier web pages 650 and 654. Third tier web page 654 links to a third tier web page 656. The third tier web page 658 links to a third tier web page 660.

As discussed with respect to FIG. 5, display order for search criteria may be determined based on the number of links from a web page. However, some embodiments may be configured to determine search display order based on a distance from the home page associated with the search result. More specifically, with respect to FIG. 6, if the web page 652 was determined to be a search result of a search conducted in FIG. 4, the search engine server 104 might determine that the web page 652 is a distance of two steps from the home page 640. More specifically, being a third tier web page, the web page 652 is two steps away from the home page 640. Comparing this with a previous example from FIG. 5, if the web page 542 is also a search result with the web page 652, depending on the sort order criteria, a different search display order may be provided.

More specifically, if a display order is determined based on the number of links from a web page, the web page 542 might receive less weight than the web page 652. Since the web page 652 includes four links to other web pages, the web page 652 may receive a value of 4. The web page 542, on the other hand, includes only two links to other web pages, and thus may receive a value of 2. However, if display order is determined based on relative distance to a home page, the web page 542 may receive a value greater than the web page 652. As the web page 542 is a second tier web page (e.g., the web page 542 is one step from the home page 540), and the web page 652 is a third tier web page (e.g., the web page 652 requires two steps to reach the web page 640), the web page 542 may be given greater weight than the web page 652 in determining display order.

Figure 7:
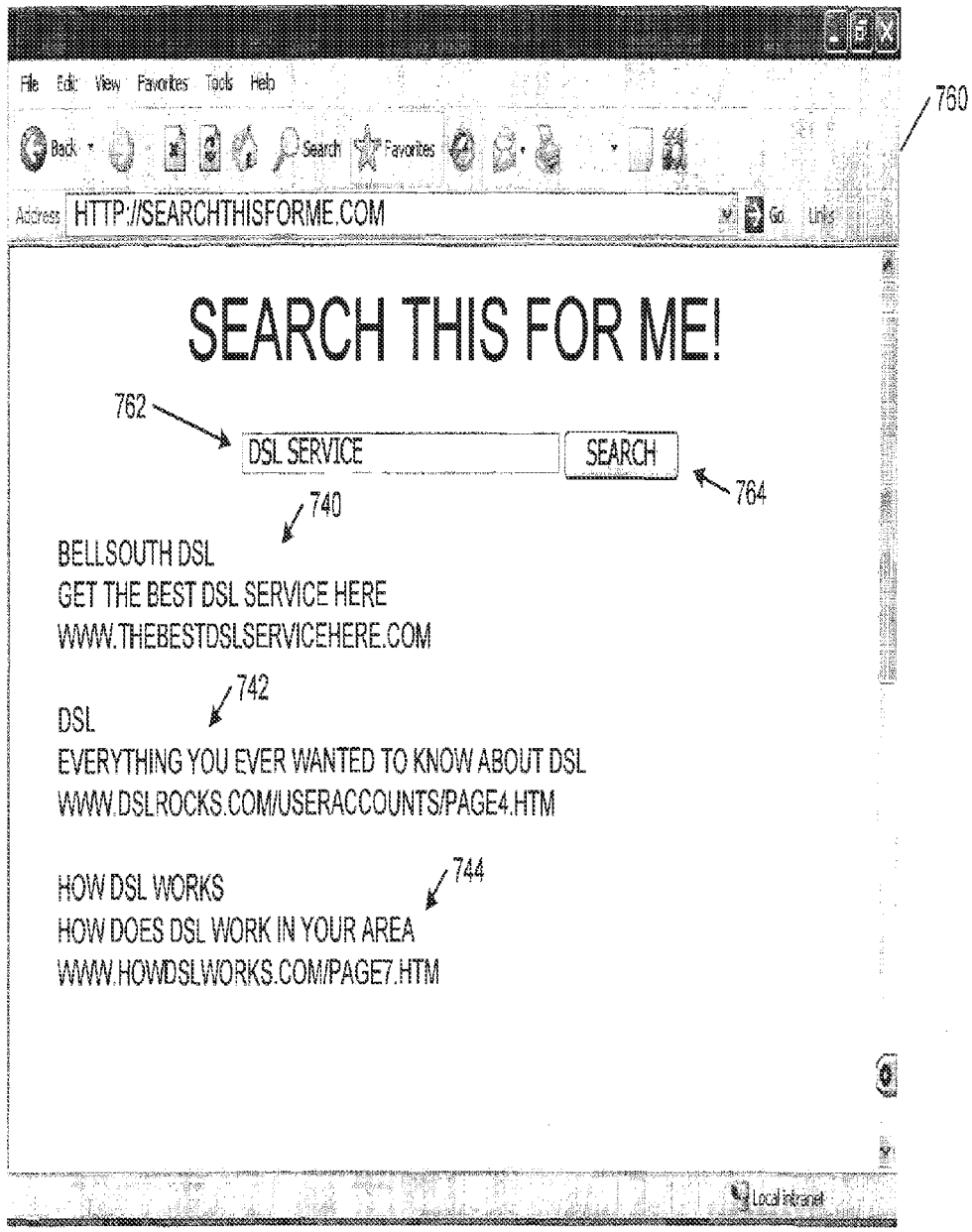
FIG. 7 is an exemplary user interface, illustrating a sort order for the search results, such as the search results from FIG. 4.

FIG. 7 is an exemplary user interface, illustrating a sort order for the search results, such as the search results 442, 444, 446, from FIG. 4. As illustrated in the non-limiting example of FIG. 7, the user interface 760 includes a text prompt 762 and a search execution option 764. Also included in the user interface 760 are search results 740, 742, and 744. The search results 740-744 may be those search results from FIG. 4 displayed in a display order pursuant to a determination based on relevance. As discussed with respect to FIGS. 5 and 6, display or display order may be determined based on any number of factors including but not limited to number of links from a web page and/or distance from a home page.

More specifically, in determining display order, the search engine server 104 and/or website server 106 can compare at least a portion of the data illustrated in Table 1.

TABLE 1 data for determining sort order

Search Terms: "DSL" or "Service"

|  | "DSL" | "How DSL Works" | "BellSouth DSL" |
|---|---|---|---|
| Total Word Match | 7 | 4 | 8 |
| Word Match Description | 1 | 0 | 0 |
| Word Match Body | 4 | 3 | 4 |
| Word Mach Keyword | 2 | 1 | 4 |
| Avg. Distance between Words | 3 | 1.4 | 1.0 |
| Links to Page | 4 | 4 | 1 |
| Distance from Home Page | 7 | 5 | 2 |

As illustrated in Table 1, sort order may be determined, based any of a plurality of data including total word match. More specifically, the web page "DSL" includes seven total occurrences of the terms "DSL" or "Service." The "How DSL Works" web page includes four total occurrences of the terms "DSL" or "Service." The "BellSouth DSL" web page includes eight total occurrences of the terms "DSL" or "Service." As such, depending on the particular configuration of the sorting logic, "BellSouth DSL" may be sorted as being most relevant, followed by "DSL," and followed by "How DSL Works."

Other criteria in Table 1 that may determine (or help determine) sort order includes the number of times one or more of the search terms occur in the description associated with the web page (see FIG. 4). Other criteria may include the number of times one or more of the search terms occur in the body of the web page, and/or the number of times one or more of the search terms occur in the keywords section (see FIG. 4). Still other criteria includes the average distance between the search terms in the web page, the number of links from the web page, and a distance the web page resides from a home page. According to exemplary embodiments, criteria used to determine sort order may further include any combination of data as suggested in Table 1.

Figure 8:
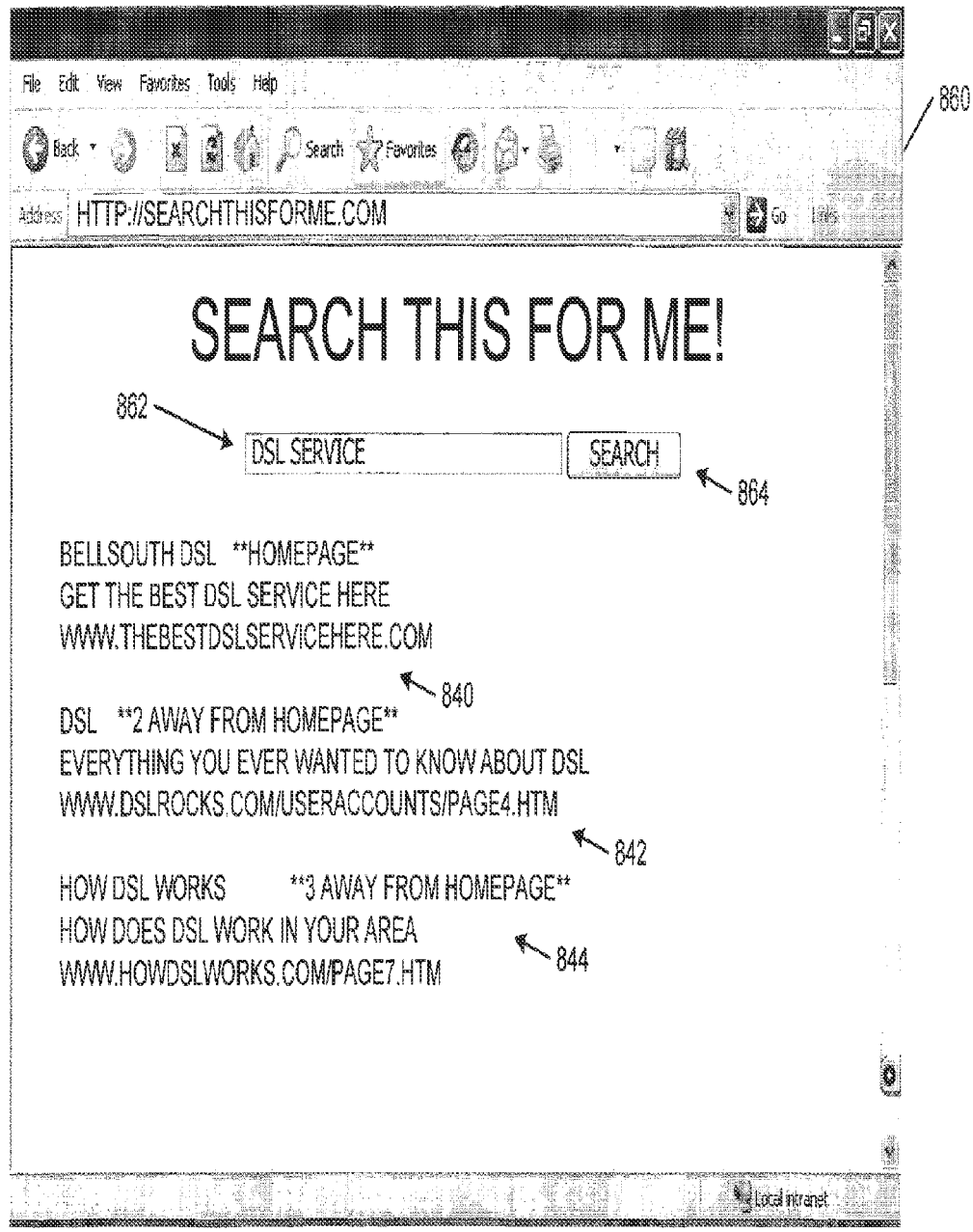
FIG. 8 is an exemplary user interface illustrating a display order of search results from FIG. 4, further illustrating a determined distance from the home page.

FIG. 8 is an exemplary user interface illustrating a display order of search results from FIG. 4, further illustrating a determined distance from the home page. More specifically, the user interface 860 includes a text prompt 862 and a search execution option 864. Also included in the user interface 860, are search results 840, 842, 844. The search results 840, 842, and 844 also include a designation of their relative distance from their respective home pages. As illustrated, the search result 840, entitled "BellSouth DSL" is the home page associated with that website. As such, if sort order is determined based on relative distance to a home page, the search result 840 would be likely given the highest rate value for that category. Similarly, the search result 842, entitled "DSL," is two steps away from its respective home page. The search result 844, entitled "How DSL Works," is three steps away from its respective home page, and thus would be given the least amount of weight for that category as compared to the search results 840 and 842.

Figure 9:
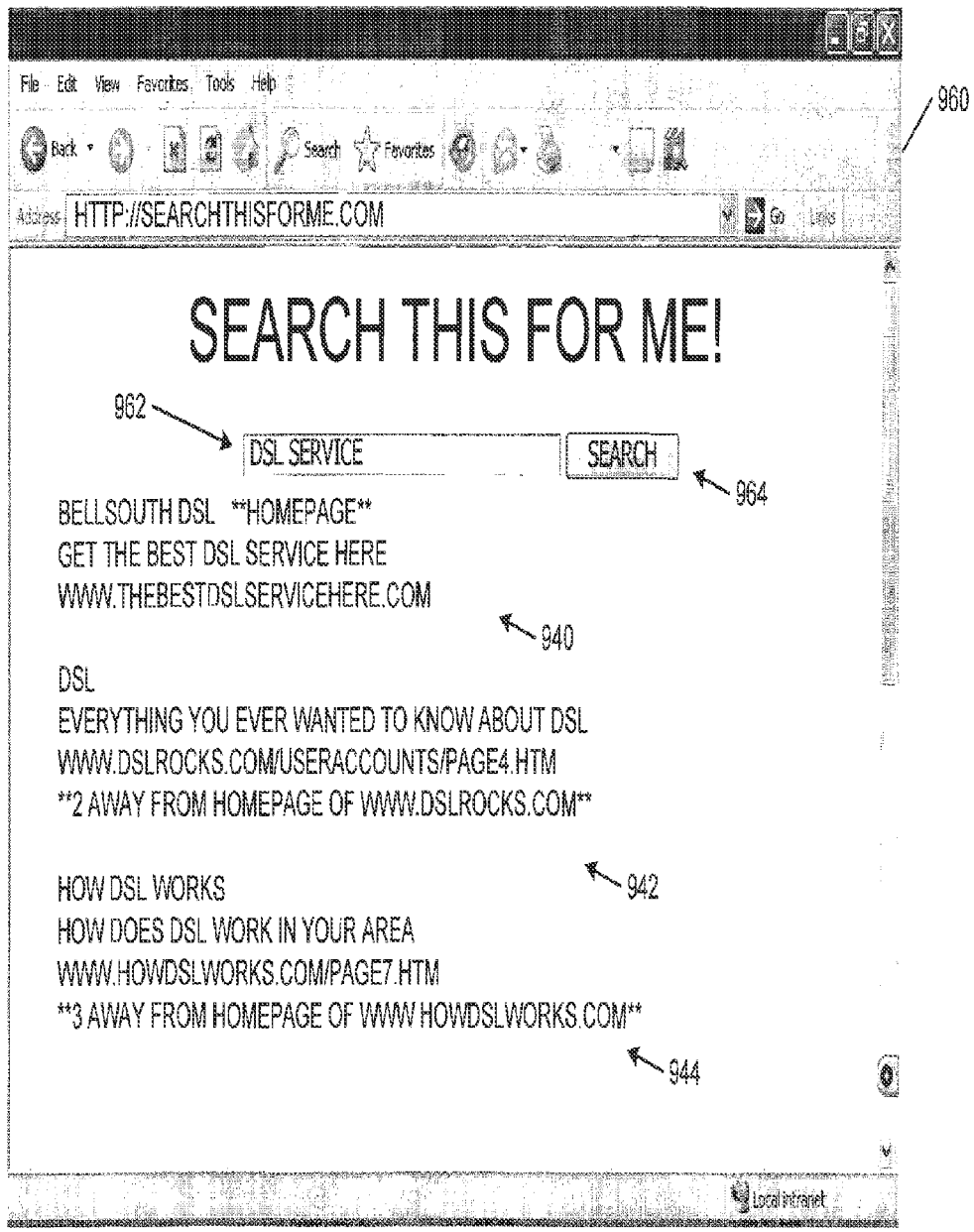
FIG. 9 is an exemplary embodiment of a user interface, illustrating a plurality of search results and including a link to a home page associated with the search results, similar to user interface from FIG. 8.

FIG. 9 is an exemplary embodiment of a user interface, illustrating a plurality of search results and including a link to a home page associated with the search results, similar to user interface from FIG. 8. As illustrated in the non-limiting example of FIG. 9, a user interface 960 includes a text prompt 962 and a search execution option 964. Also included in the user interface 960, are search results 940, 942, and 944. More specifically, as discussed above, the search engine server 104 may be configured to search the Internet, an Intranet, and/or a website for the search terms indicated in the text prompt 962. Upon retrieving the search results, the search engine server 104 may then determine a display order for the search results. Additionally, as illustrated in the user interface 960, the relative distance with respect to a home page is also provided. More specifically, the search result 940 entitled "BellSouth DSL" is the home page. Similarly, the search result 942, entitled "DSL," is two steps away from the home page www.dslrocks.com. The search result 944, entitled "How DSL Works," is three steps away from the home page www.howdslworks.com. While FIG. 8 illustrates the relative distance from the home page, FIG. 9 provides a link for the user to access either (or both) the search result or the home page associated with the search result.

Figure 10:
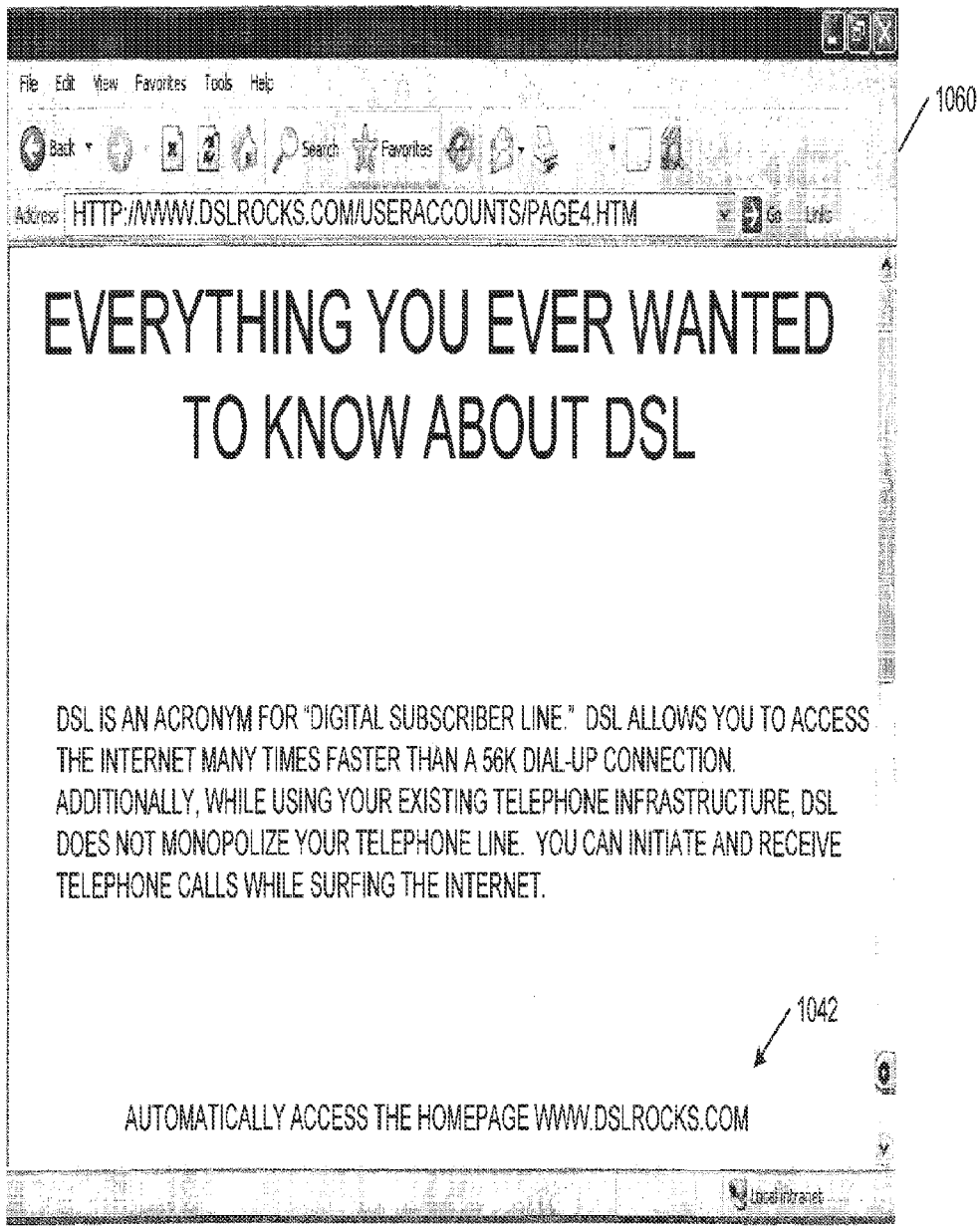
FIG. 10 is an exemplary embodiment of a user interface, illustrating a web page associated with a search result from FIG. 9.

FIG. 10 is an exemplary embodiment of a user interface, illustrating a web page associated with a search result from FIG. 9. As illustrated in the non-limiting example of FIG. 10, a user interface 1060 includes a display for a web page entitled "Everything you ever wanted to know about DSL." More specifically, the web page illustrated in the user interface 1060 may be accessible via user interface 960, from FIG. 9, by selecting the search result 942, entitled "DSL," with description "Everything you ever wanted to know about DSL. Also illustrated in the user interface 1060 is an option 1042 to provide automatic access to the web page www.dslrocks.com. More specifically, by selecting the search result 942 from FIG. 9, the search engine server 104 can automatically provide a link to a home page associated with that search result. The link to the home page may not automatically be provided by the search result selected, thus the user may have greater access to the home page by selecting the search result 942.

One should note that while the non-limiting example of FIG. 10 illustrates a link being included in the original web page interface 1060. Some embodiments may provide a new frame and/or a new window for providing this link to a user.

Figure 11:
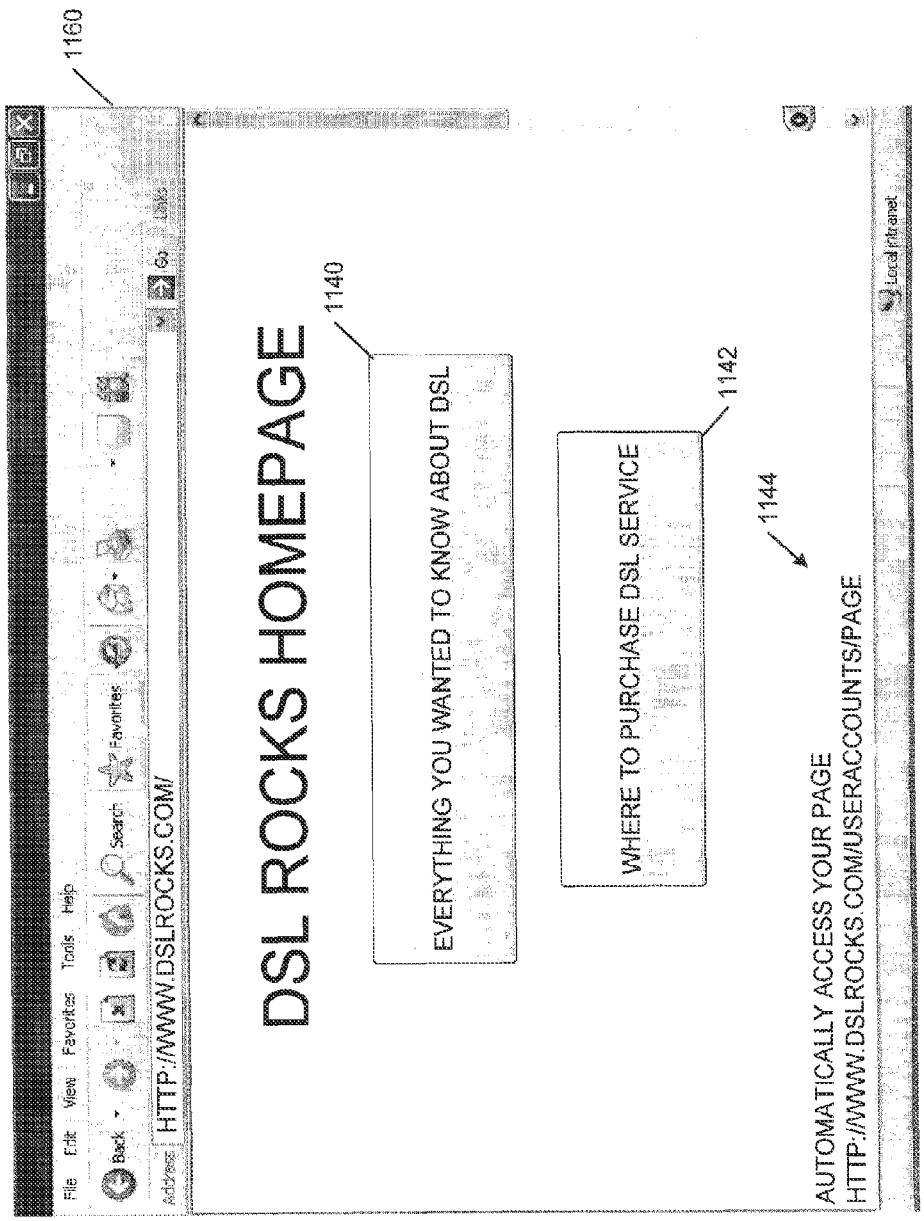
FIG. 11 is an exemplary embodiment of a user interface illustrating a home page related to a search result from FIG. 9.

FIG. 11 is an exemplary embodiment of a user interface illustrating a home page related to a search result from FIG. 9. As illustrated in the non-limiting example of FIG. 11, a user interface 1160 includes a display for the home page DSL Rocks. More specifically, the web page displayed in the user interface 1160 may be accessed via selection of the option 1042 from FIG. 10 and/or via selection of the home page option associated with the search result 942 from FIG. 9. The home page illustrated in the user interface 1160 includes an option 1140 provided by the website to access the web page from FIG. 10, as well as an option 1142 to purchase DSL service. Additionally, the search engine server 104 can include an option 1144 (in the current user interface 1160, in a separate frame, and/or in a separate window), not otherwise provided by the web page www.dslrocks.com, to access the search result 942 illustrated in FIG. 9.

Figure 12:
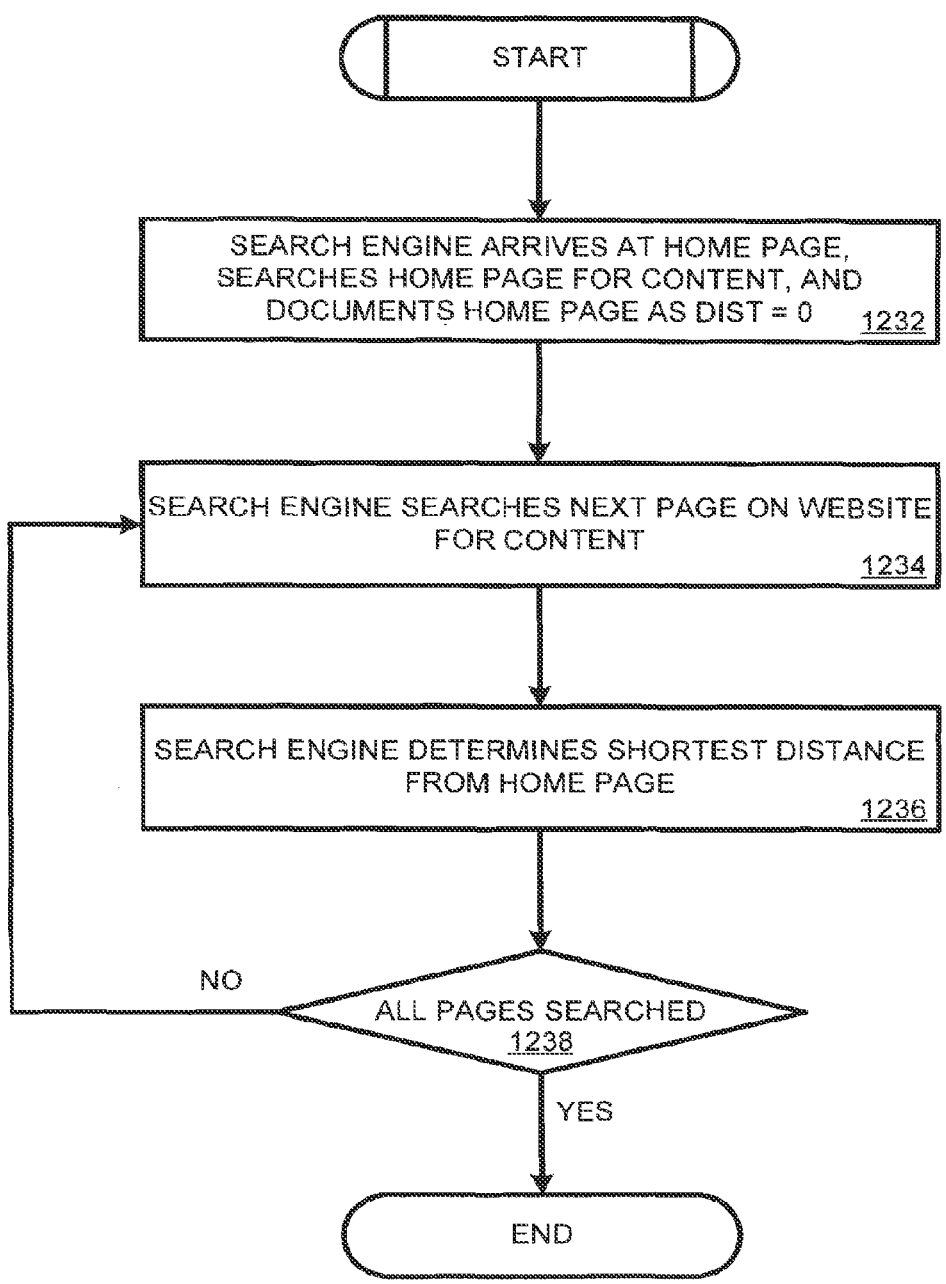
FIG. 12 is a flowchart illustrating an exemplary process that may be used to determine a distance between a search result and a home page, such as the search results from FIG. 4.

FIG. 12 is a flowchart illustrating an exemplary process that may be used to determine a distance between a search result and a home page, such as the search results from FIG. 4. As illustrated in the non-limiting example of FIG. 12, the search engine server 104 and/or website server 106 receives data related to a home page, searches the home page for content, and determines the distance of the home page to be equal to zero (block 1232). The search engine server 104 searches the next page in the website for content (block 1234). The search engine server 104 then determines the shortest distance of the web page from the home page (block 1236). The search engine server 104 can then determine whether all the pages on the website have been searched (block 1238). If all the pages have not been searched, the search engine server 104 can search the next page on the website for content, as illustrated in block 1234. The process can continue until all pages have been searched.

While in one embodiment, the search engine server 104 can perform the process of FIG. 12 in response to a user executing a search, as illustrated in FIG. 3, other embodiments may provide that the search engine server 104 performs at least a portion of the process illustrated in FIG. 12 prior to a search being completed. More specifically, the search engine server 104 (and/or website server 106) may determine the most likely search terms and/or web pages to provide quicker service when a user executes a search for those search terms.

Additionally, while the process of FIG. 12 illustrates that the search engine server 104 first arrives at the home page of a website, this is also a non-limiting example. More specifically, in at least one embodiment, the search engine server 104 can arrive at any web page associated with the website. The search engine server 104 can then determine relative distance of the web page from a homepage of the website, which can then be amended if a new web page is determined to be closer to the home page.

Figure 13A:
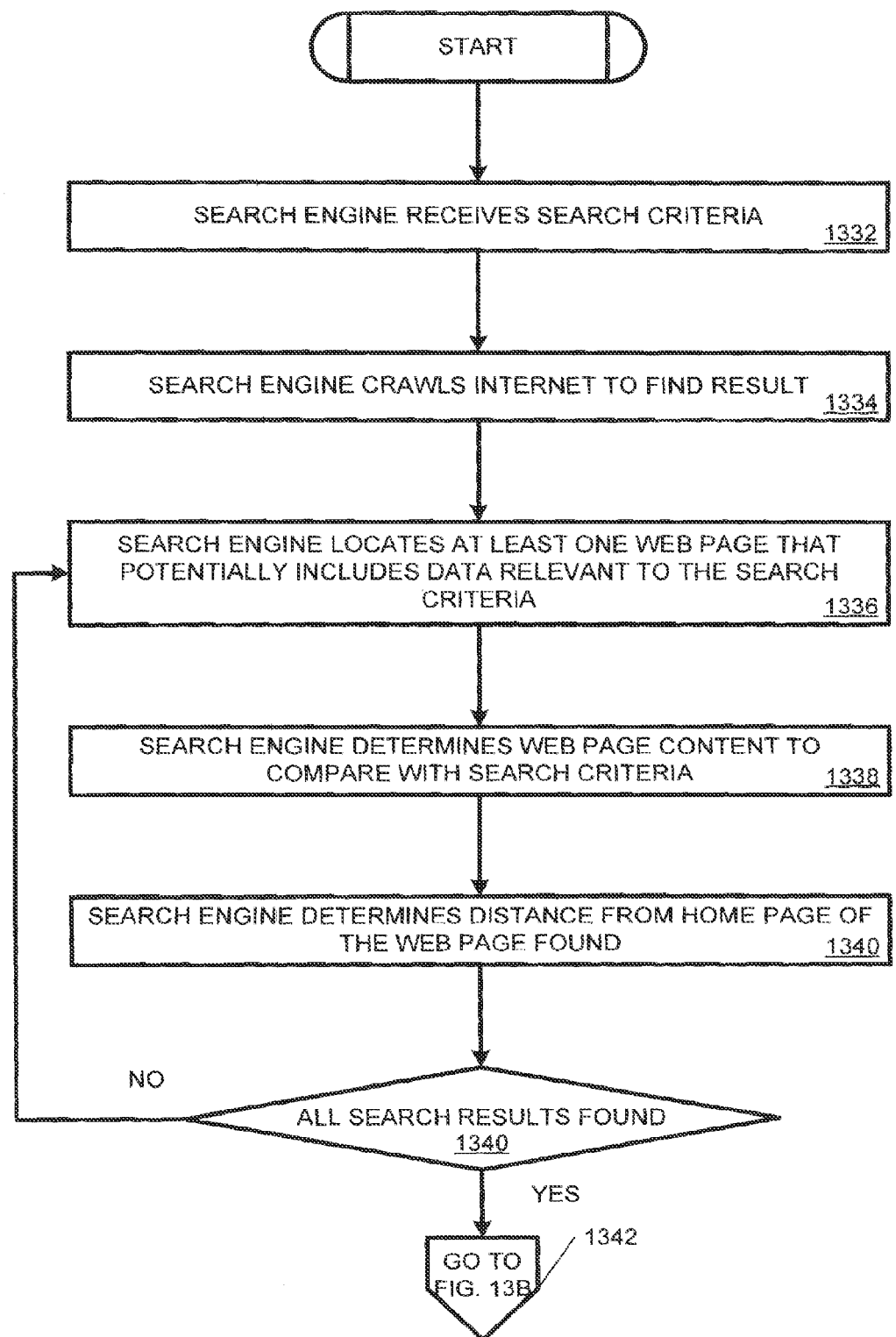
FIG. 13A is a flowchart illustrating an exemplary process that may be utilized to determine a display order of search results, similar to the flowchart from FIG. 12.

FIG. 13A is a flowchart illustrating an exemplary process that may be utilized to determine a display order of search results, similar to the flowchart from FIG. 12. As illustrated in the non-limiting example of FIG. 13A, the search engine server 104 and/or website server 106 can receive search criteria from a user (block 1332). The search engine server 104 can then crawl the Internet to find a result (block 1334). While FIG. 13A indicates that search engine server can crawl the Internet to find the result, one should also note that the search engine server 104 can be associated with an Intranet, and that the search can be restricted to web pages on the Intranet.

The search engine server 104 can then locate at least one web page that potentially includes data relevant to the search criteria (block 1336). The search engine server 104 then determines web page content to compare with the search criteria (block 1338). If the web page content relates to the search criteria, the information related to the web page can be stored for subsequent delivery to the user.

The search engine server 104 can then determine a distance from a home page associated with the web page found (block 1340). While at least one embodiment may be configured such that the search engine server 104 determines the shortest distance between the determined web page and the home page, this is a non-limiting example. More specifically, depending on the particular embodiment, the search engine server 104 can determine the shortest distance, the longest distance, an average distance, or other distance.

Next, the search engine server 104 can determine whether all search results are found (block 1340). If all the search results are not found, the flowchart can return to block 1336 to locate at least one web page that potentially includes data relevant to the search criteria. If, on the other hand, all search results are found, the flowchart proceeds to jump block 1342.

Figure 13B:
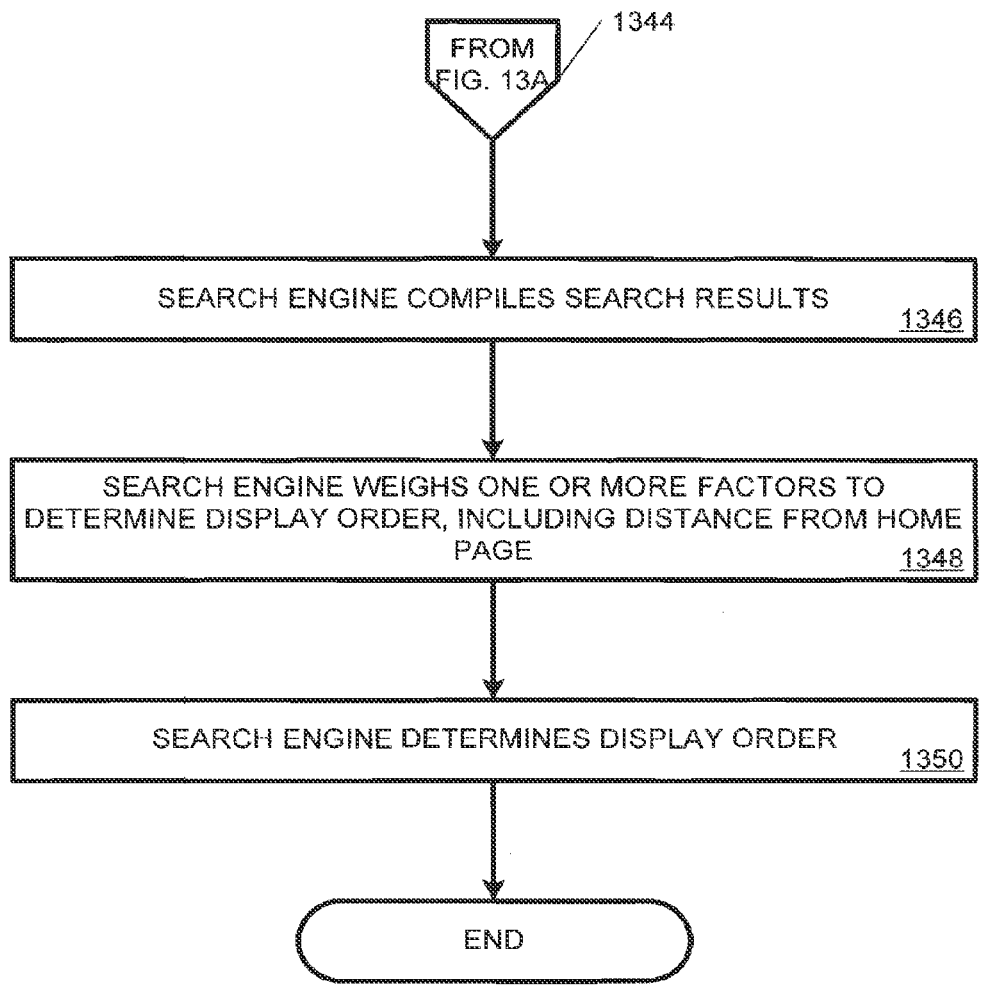
FIG. 13B is a continuation of the flowchart from FIG. 13A.

FIG. 13B is a continuation of the flowchart from FIG. 13A. From jump block 1344, the search engine server 104 proceeds to compile at least a portion of the search results (block 1346). The search engine server 104 then weighs one or more factors, including a distance from the home page, to determine a display order of the search results (block 1348). The search engine server 104 then determines a display order for the search results (block 1350).

One should note that while the discussion related to FIGS. 13A and 13B describe an embodiment where the search engine server 104 crawls the Internet (or Intranet) after search criteria is received, this is a non-limiting example. More specially, in at least one exemplary embodiment, the search engine server 104 (and/or website server 106) may be configured to "crawl" the Internet prior to receiving search criteria. Such a configuration could enhance the speed for providing search results to a user.

Figure 14:
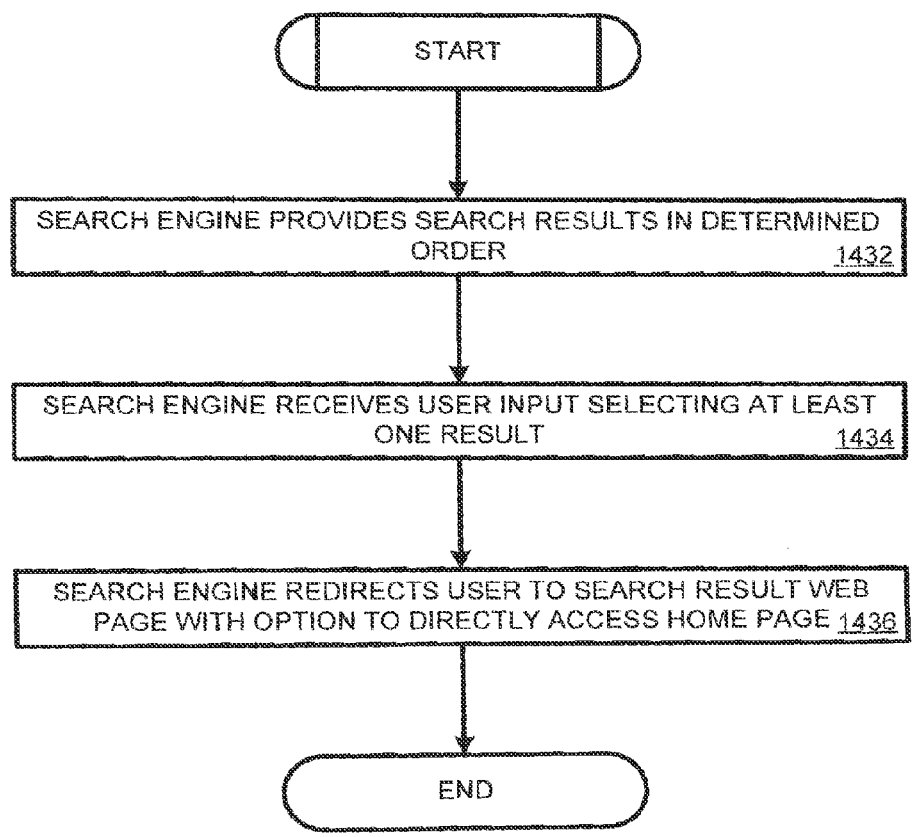
FIG. 14 is a flowchart illustrating an exemplary process that may be utilized for redirecting a user to a web page, similar to the flowchart from FIGS. 13A and 13B.

FIG. 14 is a flowchart illustrating an exemplary process that may be utilized for redirecting a user to a web page, similar to the flowchart from FIGS. 13A and 13B. As illustrated in the non-limiting example of FIG. 14, the search engine server 104 and/or website server 106 may provide search results in a determined order (block 1432). The search engine server 104 may then receive user input selecting at least one result (block 1434). The search engine server 104 can then redirect the user to the search result web page with an option to directly access the home page, associated with the search result web page (block 1436).

Figure 15:
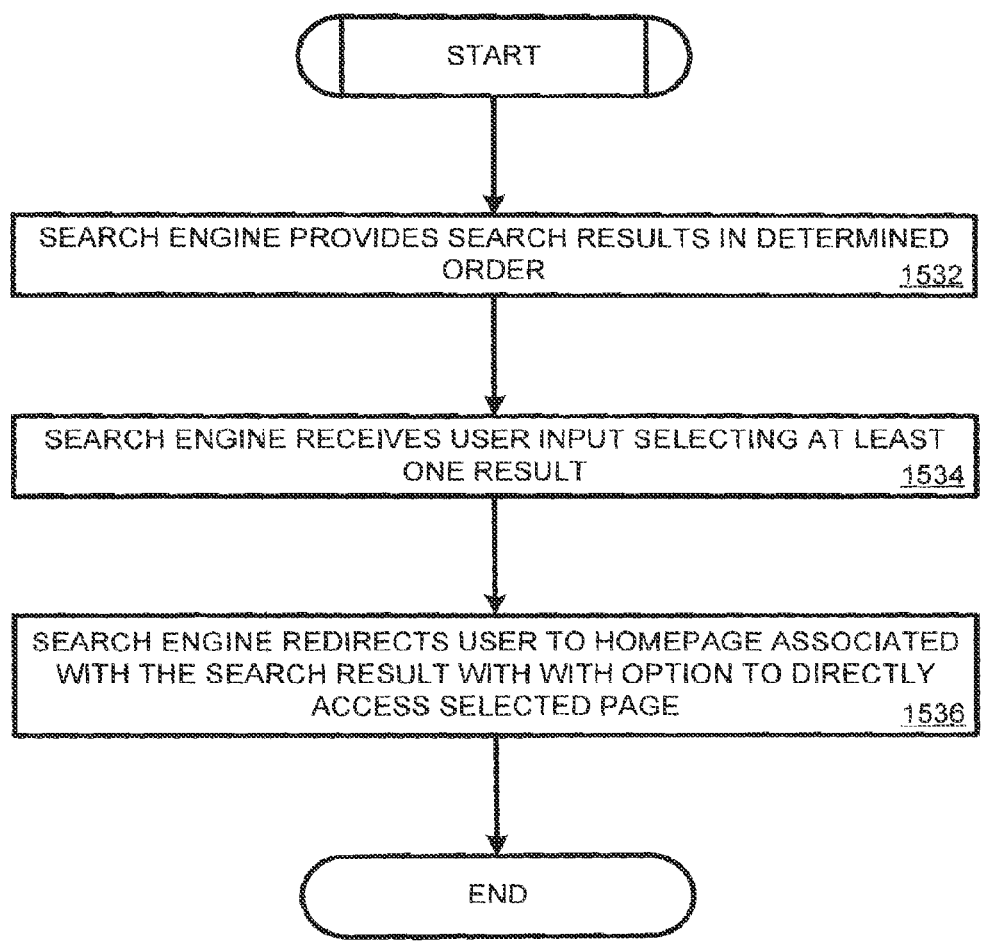
FIG. 15 is a flowchart illustrating the exemplary process that may be utilized for redirecting a user to a home page associated with a search result, similar to the flowchart from FIG. 14.

FIG. 15 is a flowchart illustrating the exemplary process that may be utilized for redirecting a user to a home page associated with a search result, similar to the flowchart from FIG. 14. As illustrated in the non-limiting example of FIG. 15, the search engine server 104 and/or website server 106 may provide search results in a determined order (block 1532). The search engine server 104 may then receive user input selecting at least one result (block 1534). The search engine server 104 can then redirect a user to a home page associated with the selected search result with an option to directly access the selected home page (block 1536).

The embodiments disclosed herein can be implemented in hardware, software, firmware, or a combination thereof. At least one embodiment, disclosed herein is implemented in software and/or firmware that is stored in a memory and that is executed by a suitable instruction execution system. If implemented in hardware, as in an alternative embodiment embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

What is claimed is:

1. A method comprising:
   determining, on a computing device, a plurality of search results associated with at least one search criterion;
   determining, on the computing device, a respective home page for each search result of the plurality of search results;
   determining, on the computing device, a display order for the plurality of search results based on a criterion comprising a distance for each search result, wherein a respective distance for a search result comprises a respective number of web pages between the search result and a respective home page of the search result; and
   providing the plurality of search results for display in the display order on a user intferface, wherein providing the plurality of search results comprises:
   providing each search result for display on the user interface,
   providing each respective home page for each search result for display on the user interface proximate to each search result, and
   providing each respective distance for each search result for display on the user interface proximate to each search result.

2. The method of claim 1, wherein the display order is further determined based on a number of links on each search result.

3. The method of claim 1, wherein the display order is further determined based on a number of occurrences of the at least one search criterion on each search result.

4. The method of claim 1, wherein the respective number of web pages between the search result and the respective home page of the search result comprises a smallest number of web pages between the search result and the respective home page of the search result.

5. The method of claim 1, wherein the respective number of web pages between the search result and the respective home page of the search result comprises an average number of web pages between the search result and the respective home page of the search result.

6. The method of claim 1, wherein the display order is further determined based on a number of occurrences of the at least one search criterion on a section of each search result.

7. The method of claim 1, wherein the display order is further determined based on a number of occurrences of the at least one search criterion on each search result and a number of links on each search result.

8. A system comprising:
   a memory comprising instructions; and
   a processor coupled to the memory, wherein the processor, when executing the instructions, effectuates operations comprising:
   determining a plurality of search results associated with at least one search criterion;
   determining a respective home page for each search result of the plurality of search results;
   determining a display order for the plurality of search results based on a criterion comprising a distance for each search result, wherein a respective distance for a search result comprises a respective number of web pages between the search result and a respective home page of the search result; and
   providing the plurality of search results for display in the display order on a user interface, wherein providing the plurality of search results comprises:
   providing each search result for display on the user interface,
   providing each respective home page for each search result for display on the user interface proximate to each search result, and
   providing each respective distance for each search result for display on the user interface proximate to each search result.

9. The system of claim 8, wherein the display order is further determined based on a number of links on each search result.

10. The system of claim 8, wherein the display order is further determined based on a number of occurrences of the at least one search criterion on each search result.

11. The system of claim 8, wherein the number of web pages between the search result and the respective home page of the search result comprises a smallest number of web pages between the search result and the respective home page the of the search result.

12. The system of claim 8, wherein the number of web pages between the search result and the respective home page of the search result comprises an average number of web pages between the search result and the respective home page of the search result.

13. The system of claim 8, wherein the display order is further determined based on a number of occurrences of the at least one search criterion on a section of each search result.

14. The system of claim 8, wherein the display order is further determined based on a number of occurrences of the at least one search criterion on each search result and a number of links on each search result.

15. A non-transitory computer-readable medium comprising computer-executable instructions, which when executed by a processor, cause the processor to effectuate operations comprising:
   determining a plurality of search results associated with at least one search criterion;
   determining a respective home page for each search result of the plurality of search results;
   determining a display order for the plurality of search results based on a criterion comprising a distance for each search result, wherein a respective distance for a search result comprises a respective number of web pages between the search result and a respective home page of the search result; and
   providing the plurality of search results for display in the display order on a user interface, wherein providing the plurality of search results comprises:
      providing each search result for display on the user interface,
      providing each respective home page for each search for display on the user interface proximate to each respective search result, and
      providing each respective distance for each search result for display on the user interface proximate to each search result.

16. The non-transitory computer-readable medium of claim 15, wherein the display order is further determined based on a number of links on each search result.

17. The non-transitory computer-readable medium of claim 15, wherein the display order is further determined based on a number of occurrences of the at least one search criterion on each search result.

18. The non-transitory computer-readable medium of claim 15, wherein the respective number of web pages between the search result and the respective home page of the search result comprises a smallest number of web pages between the search result and the respective home page of the search result.

19. The non-transitory computer readable medium of claim 15, wherein the respective number of web pages between the search result and the respective home page of the search result comprises an average number of web pages between the search result and the respective home page of the search result.

20. The non-transitory computer-readable medium of claim 15, wherein the display order is further determined based on a number of occurrences of the at least one search criterion on a section of each search result.

\* \* \* \* \*

UNITED STATES PATENT AND TRADEMARK OFFICE
CERTIFICATE OF CORRECTION

| | | |
|---|---|---|
| PATENT NO. | : 8,745,043 B2 | Page 1 of 1 |
| APPLICATION NO. | : 13/938699 | |
| DATED | : June 3, 2014 | |
| INVENTOR(S) | : Robert Todd Stephens | |

It is certified that error appears in the above-identified patent and that said Letters Patent is hereby corrected as shown below:

In the Claims

Column 11,
Claim 1, line 64, delete "intferface," and insert -- interface, --.

Signed and Sealed this
Ninth Day of June, 2015

Michelle K. Lee
*Director of the United States Patent and Trademark Office*